United States Patent
Yoshizawa et al.

(10) Patent No.: US 9,515,418 B2
(45) Date of Patent: Dec. 6, 2016

(54) ENERGY RECEIVING PORT DEVICE OF VEHICLE

(71) Applicant: JOHNAN MANUFACTURING INC., Nagano (JP)

(72) Inventors: Masakane Yoshizawa, Nagano (JP); Tsuyoshi Kondo, Nagano (JP); Hideaki Takehara, Nagano (JP); Shun Sakurai, Ueda (JP)

(73) Assignee: JOHNAN MANUFACTURING INC., Nagano (JP)

(*) Notice: Subject to any disclaimer, the term of this patent is extended or adjusted under 35 U.S.C. 154(b) by 0 days.

(21) Appl. No.: 14/785,225

(22) PCT Filed: Dec. 9, 2013

(86) PCT No.: PCT/JP2013/082955
§ 371 (c)(1),
(2) Date: Oct. 16, 2015

(87) PCT Pub. No.: WO2014/171035
PCT Pub. Date: Oct. 23, 2014

(65) Prior Publication Data
US 2016/0087375 A1  Mar. 24, 2016

(30) Foreign Application Priority Data

Apr. 17, 2013 (JP) .................................. 2013-086974

(51) Int. Cl.
*B60K 15/05* (2006.01)
*H01R 13/639* (2006.01)
(Continued)

(52) U.S. Cl.
CPC .............. *H01R 13/639* (2013.01); *B60K 1/04* (2013.01); *B60K 15/05* (2013.01); *B60L 11/18* (2013.01); *B60L 11/1818* (2013.01)

(58) Field of Classification Search
CPC . H01R 13/639; H01R 13/6397; H01R 13/447; B60L 11/118; B60L 11/1818; B60L 11/1816; B60K 15/05; B60K 1/04
(Continued)

(56) References Cited

U.S. PATENT DOCUMENTS 5,757,595 A * 5/1998 Ozawa ................ B60L 11/1818
  320/104
5,816,643 A * 10/1998 Itou ..................... B60L 11/1846
  296/97.22
(Continued)

FOREIGN PATENT DOCUMENTS

JP   11-332024     11/1999
JP   2010-259277   11/2010
(Continued)

OTHER PUBLICATIONS

Japanese Office Action mailed Jun. 28, 2016 in related Japanese Application No. 2013-086974.
International Search Report mailed Jan. 14, 2014, in corresponding International Application No. PCT/JP2013/082955.

*Primary Examiner* — Abdullah Riyami
*Assistant Examiner* — Harshad Patel
(74) *Attorney, Agent, or Firm* — Staas & Halsey LLP

(57) ABSTRACT

Technical problem to be solved is to provide an energy receiving port device 3 which makes movement of a supply gun 10 to a removing direction during energy supplying impossible only by a lid 5 for opening and closing a receiving port part 4, and improve a situation in which the receiving port part 5 is widely opened during the supplying. The lid 5 for opening and closing the receiving port part 4 comprises a first lid 5a and a second lid 5b that form a plane lid when the lids are closed. An opening and closing device 6a of the first lid 5a and an opening and closing device 6b of the second lid 5b are provided. The supply gun 10 connected to the receiving port 8 is pinched by the first lid 5a and the second lid 5b to make a movement in a removing direction of the supply gun 10 impossible.

7 Claims, 12 Drawing Sheets

(51) Int. Cl.
*B60K 1/04* (2006.01)
*B60L 11/18* (2006.01)

(58) Field of Classification Search
USPC ....... 439/135, 134, 133, 136, 310, 345, 372, 439/511
See application file for complete search history.

(56) References Cited

U.S. PATENT DOCUMENTS

| | | | |
|---|---|---|---|
| 8,550,833 B2* | 10/2013 | Martin | H01R 13/6395 439/310 |
| 9,199,551 B2* | 12/2015 | Kahara | B60L 1/003 |
| 9,233,619 B2* | 1/2016 | Ono | H01M 10/44 |
| 9,260,080 B2* | 2/2016 | Maguire | B60L 11/1818 |
| 2011/0281447 A1 | 11/2011 | Kano et al. | |
| 2013/0196522 A1 | 8/2013 | Hara | |
| 2016/0083981 A1* | 3/2016 | Kondo | B60K 1/04 49/31 |

FOREIGN PATENT DOCUMENTS

| | | |
|---|---|---|
| JP | 2011-238535 | 11/2011 |
| JP | 2011-243343 | 12/2011 |
| JP | 2012-34543 | 2/2012 |
| JP | 2012-76599 | 4/2012 |
| JP | 2012-236457 | 12/2012 |
| JP | 2013-10434 | 1/2013 |
| WO | 2012/042954 A1 | 4/2012 |

* cited by examiner ded in a vehicle body and a lid for opening and closing an opening of the receiving port part is provided.

ENERGY RECEIVING PORT DEVICE OF VEHICLE

CROSS-REFERENCE TO RELATED APPLICATIONS

This application is a U.S. National Stage Application, which claims the benefit under 35 U.S.C. §371 of PCT International Patent Application No. PCT/JP2013/082955, filed Dec. 9, 2013, which claims the foreign priority benefit under 35 U.S.C. §119 of Japanese Patent Application No. 2013-086974, filed Apr. 17, 2013, the contents of which are incorporated herein by reference.

TECHNICAL FIELD

The present invention relates to an energy receiving port device of a vehicle, using an energy source such as electricity and hydrogen as an energy source for driving, which requires time for receiving.

BACKGROUND ART

New generation vehicles using electricity or hydrogen as an energy source have been developed. An energy receiving port device for receiving these energy sources to a vehicle is provided in the vehicle body, and a receiving port (an inlet) is provided in a receiving part (a storage recess space) formed in the vehicle body, and the receiving port part is configured to be opened and closed by a lid (a cover).

When an energy source is supplied to the new generation vehicle, lid is opened, and a supply gun attached to the top end of a supply cable (including a case of tube for liquid) is inserted into a receiving port.

Since, under current conditions, electricity supply requires around thirty minutes to forty five minutes even for quick charging, it is difficult for a customer to be present at the charging as the case for gasoline receiving, and the customer often leaves from the vehicle. Since normal charging takes eight hours and sometimes inexpensive nighttime electric power is used, the vehicle is usually left with the supply gun (a charging gun) connected. It takes long time for hydrogen supply, instead of electricity supply, as the case for electricity supply, not like the case for gasoline receiving, and the situation mentioned above is likely to occur.

It should be noted that, in the case of electricity supply, the supply cable (an electricity supply cable) may be used not only for electricity supply to the vehicle, but also to the external from the battery of the vehicle in case of power failure or in the sake of peak shift for tight supply demand balance of electricity. In these cases, the vehicle is often left with the supply gun connected.

For this reason, various proposals have been made for preventing theft of the supply cable, mischief on the receiving port, and the like.

For this reason, various proposals have been made for preventing theft of the supply cable, mischief on the receiving port, and the like.

In the energy receiving port device (electricity receiving port part) in Japanese Patent Laid-Open No. 2012-76599, the charging port part cover (35) are attached to the lid (7) on opening state, and the lied (7) is closed with the cover (35) in the state such that the opening unit (36) is closed, preventing mischief to the interior part and theft of the electricity supply cable during long charging time.

The charging stand in the Japanese Patent Laid-Open No. 2010-259277 includes the cover (4a) and the locking means (4b) for preventing mischief to the connection unit (2a) for electricity charging (electricity charging gun) during standby, such that the locked cover (4a) makes removing of the connection unit (2a) for electricity charging impossible.

The energy source receiving device in Japanese Patent Laid-Open No. 2011-238535 includes a locking device (30) equipped with the mechanical key and the key cylinder (31) in the electricity supply plug (10), such that the engaging claw (21) of the electricity supply plug (10) is not operated unless lock by the locking device (30) is not released for removing the electricity supply plug (10) connected to the electricity receiving connector (5).

The energy source receiving device in Japanese Patent Laid-Open No. 2011-243343 has structure in which the engaging plug (16) of the electricity supply plug (1) is engaged with the locking piece (50) such that the operating unit (19) can not be operated only by inserting the electricity supply plug (10) into the inlet (31), and electric key system or mechanical key system can unlock the locking state.

SUMMARY OF THE INVENTION

Problems to be Solved by the Invention

In the energy receiving port device in Japanese Patent Laid-Open No. 2012-76599, the charging port part cover (35) closes the opening unit (36), thus few mischiefs to the interior part of the electricity supply port part occur. In addition to that, since the electricity supply port part cover includes the striker which is engaged with the locking to lock for locking, the electricity charging cable or the electricity supply gun is not removed or thieved during electricity charging as long as the locking is released.

However, preparation of the electricity charging port part cove and attaching and detaching work are troublesome.

The energy receiving port device in the Japanese Patent Laid-Open No. 2010-259277, so to speak, stores the charging gun in the cover (4a) and locks the cover, but it is difficult to form the lid of the receiving port device in a vehicle in the configuration in which the charging gun can be stored during electricity charging.

includes the cover (4a) and the locking means (4b) for preventing mischief to the connection unit (2a) for electricity charging (electricity charging gun) during standby, such that the locked cover (4a) makes removing of the connection unit (2a) for electricity charging impossible.

Furthermore, in the energy source receiving devices in Japanese Patent Laid-Open No. 2011-238535 and Japanese Patent Laid-Open No. 2011-243343, the engaging plug (16) of the electricity supply plug (10) is engaged with the inlet, such that engaging of the engaging plug (16) can not be released unless the locking is unlocked, thus removing of the electricity supply plug (10) and the electricity supply cable during electricity charging can be prevented, but there is a possibility of receiving mischief to the interior part.

The problem to be solved in the present invention is, to provide an energy receiving port device which prevents removing of the supply gun during energy source supply, not by using other parts not included in a vehicle body such as the cover above, but by using only the lid for opening and closing the receiving port part, and improve the situation in which the receiving port is widely opened during the supply.

Means for Solving the Problems

An energy receiving port device including a receiving port in storage recess space of a receiving port part provided in a vehicle body, and a lid for opening and closing the receiving port part; wherein, the lid makes movement in a removing direction of a supply gun connected to the receiving port impossible during energy supply, is provided.

The lid may consist of one lid for opening and closing, or may consist of a first lid and a second lid wherein the first lid and the second lid form a plane lid when the lids are closed.

Basic configuration, for the lid to make the movement in a removing direction of the supply gun impossible, is configuration providing a position in which the supply gun is held on a way for the lid to rotationally moves in a closing direction when the lid consists of one plate.

When the lid consists of two plates, the first lid and the second lid are configured to pinch the supply gun to make the movement in a removing direction of the supply gun impossible.

For this reason, the first lid may be configured to be rotated to move, and the second lid may be configured to be slidden to move.

With above configurations, the energy receiving port device is configured to be set in positions of, a closing position in which the first lid and the second lid close the receiving port, a locking position in which the supply gun is pinched by a lower face of the rotated first lid and a top end of the second lid, and an opening position in which the supply gun can be inserted to and removed from a gap between the first lid and the second lid, wherein the movement in the removing direction of the supply gun is impossible in the locking position.

Effects of the Invention

The lid may consist of one lid for opening and closing, or may consist of a first lid and a second lid wherein the first lid and the second lid form a plane lid when the lids are closed.

The lid can open and close the receiving port part, and lock the movement in a removing direction of the supply gun only by movement of the lid of, holding the supply gun or pinching the supply gun by the first lid and the second lid during the supply gun is connected to the receiving port.

MODES FOR CARRYING OUT THE INVENTION

Figure 1:
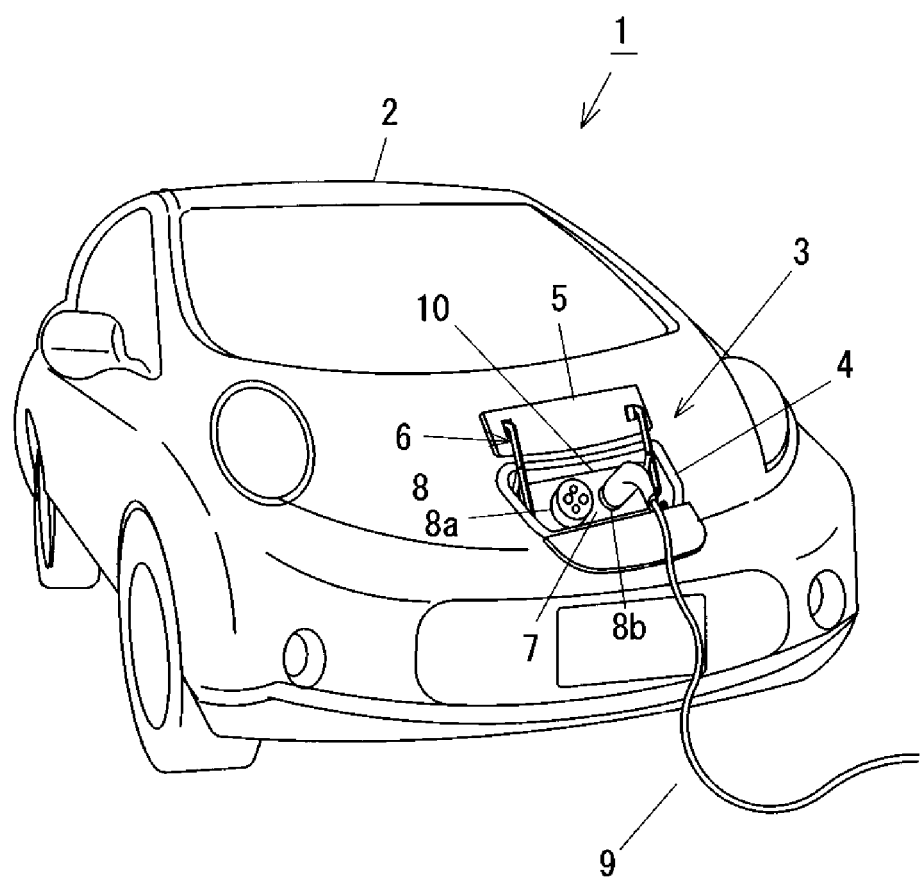
FIG. 1 is an oblique view of a new generation vehicle (during energy receiving).

FIG. 1 is an example of a new generation vehicle 1 (EV) using electricity as power source. In the new generation vehicle 1, an energy receiving port device 3 is provided in a vehicle body 2. The energy receiving port device 3 includes an energy receiving port 4, a lid 5, an opening and closing device 6 for moving the lid 5, and a receiving port 8 arranged in a storage recess space 7 of the energy receiving port.

The receiving port 8 includes a quick charging inlet 8a and a normal charging inlet 8b in the present embodiment. In FIG. 1, a supply gun attached to top end of a supply cable 9 (an electricity supply cable) is connected to the normal charging inlet 8b.

Figure 2:
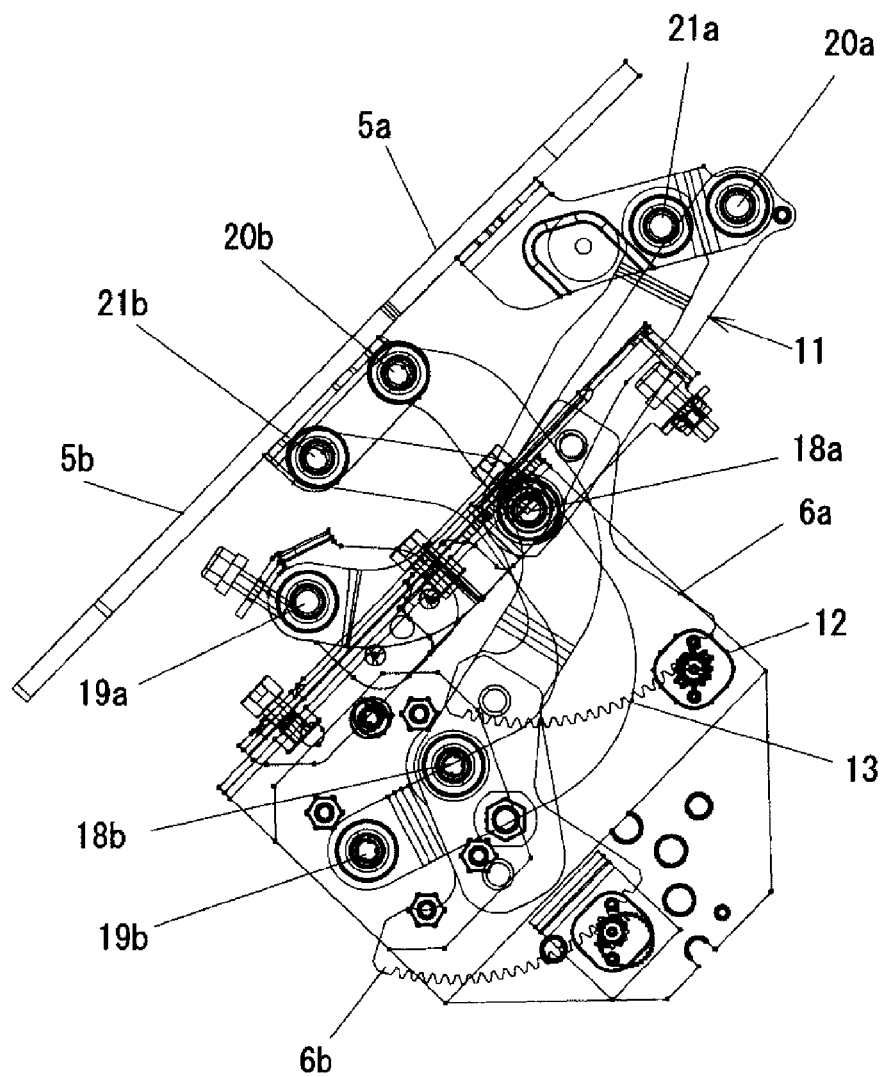
FIG. 2 is a side view of a lid opening and closing device (in closing state).
Figure 3:
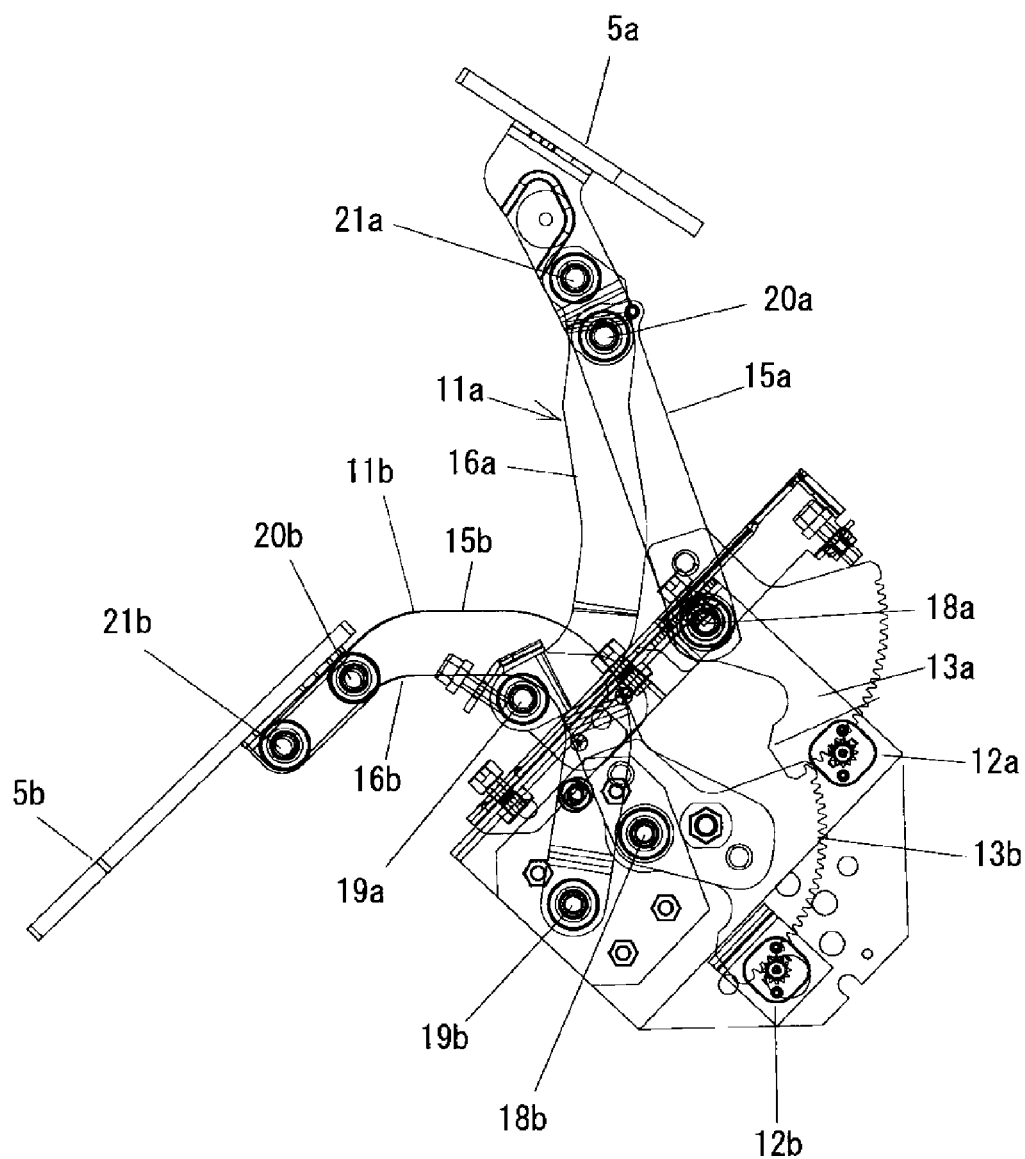
FIG. 3 is a side view of a lid opening and closing device (in opening state).
Figure 4:
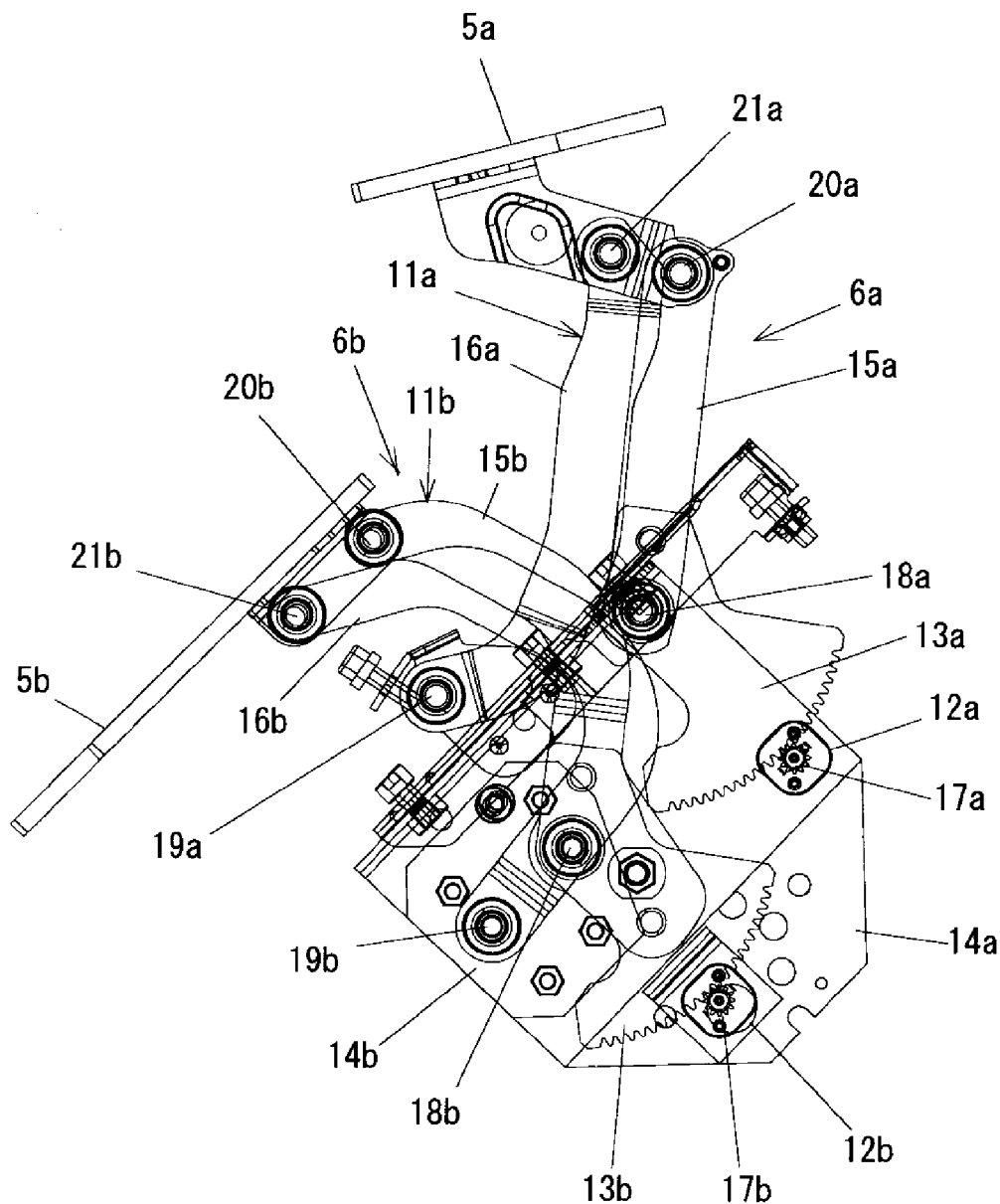
FIG. 4 is a side view of a lid opening and closing device (in locking state).

The lid 5 make the storage recess space 7 of the energy receiving port 4 opened and closed to the outside. In the present embodiment, the lid consists of a first lid 5a and a second lid 5b (FIGS. 2 to 4). These lids are moved by the opening and closing device 6 to open and close. The opening and closing device 6 consists of a link mechanism 11, a motor 12 and an interlocking gear 13 (FIG. 2). More specifically, the first lid 5a is moved in opening and closing directions by a first link mechanism 11a, and the second lid 5b is moved in opening and closing directions by a second link mechanism 11b (details are shown in FIG. 4).

An additional symbol "a" is added to the first mechanism or the components thereof and an additional symbol "b" is added to the second mechanism or the components thereof below, when the both should be respectively explained.

Figure 5:
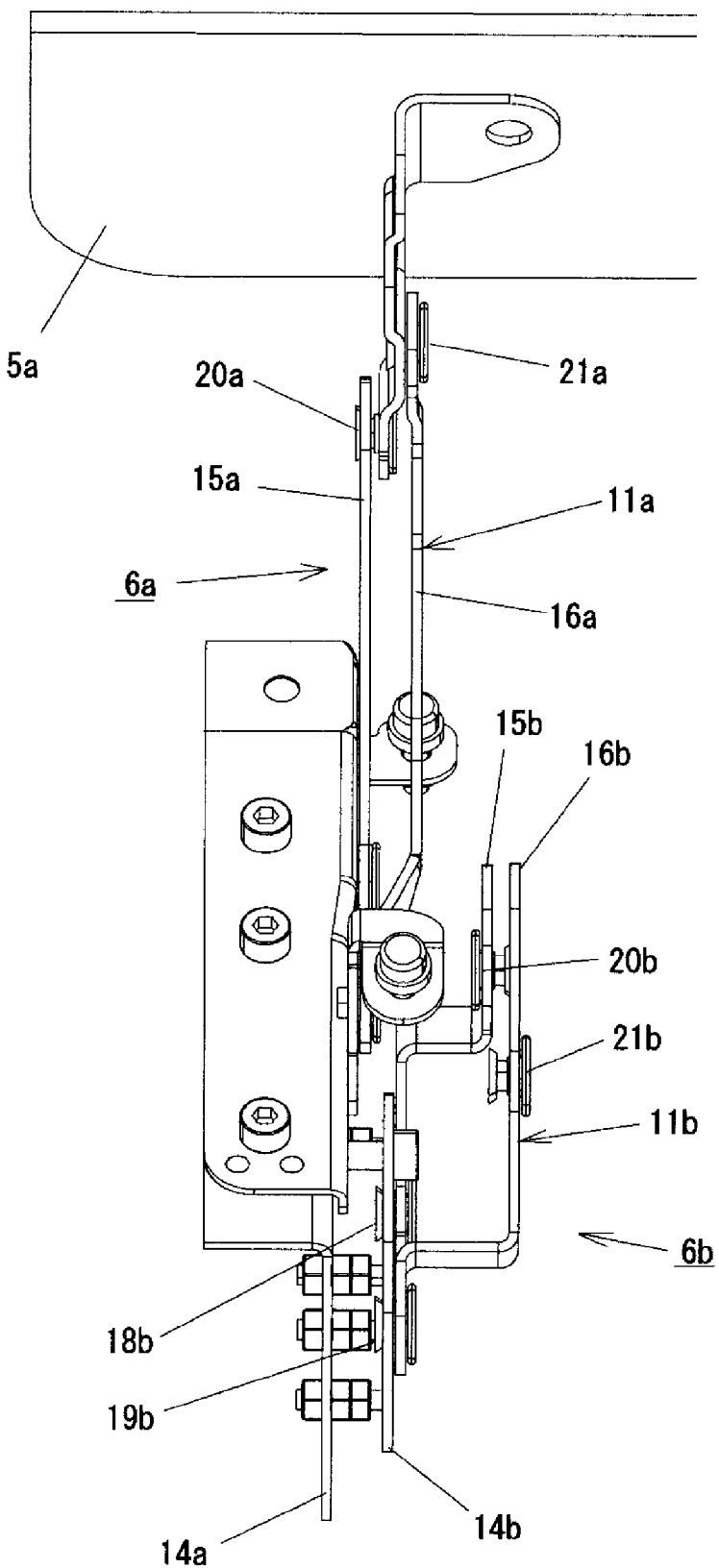
FIG. 5 is a front view of a lid opening and closing device (left side in opening state).
Figure 6:
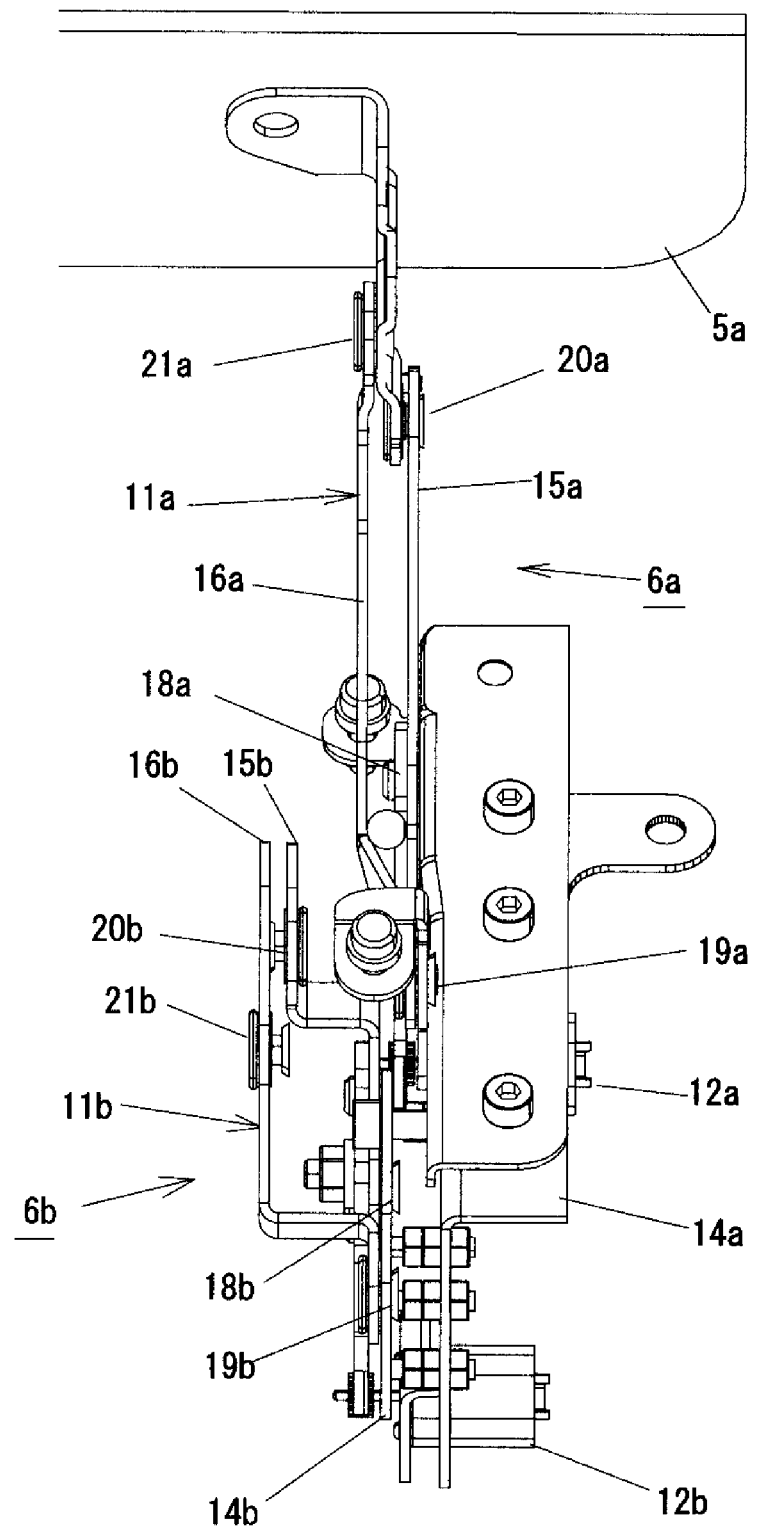
FIG. 6 is a front view of a lid opening and closing device (right side in opening state).

It should be noted that the same configurations (except for a first motor 12a) are symmetrically arranged in the right and the left side of the first lid 5a in the first link mechanism 11a, and the same configurations (except for a second motor 12b) are symmetrically arranged in the right and the left side of the second lid 5b in the second link mechanism 11b (FIG. 5, FIG. 6).

Main part of the link mechanism 11 of the opening and closing device 6 consists of a base plate 14, a primary link 15, an d an secondary link 16, and an interlocking gear 13 is fixed to the main body of the primary link 15. The interlocking gear 13 engages with a pinion 17 fixed to an output shaft of the motor 12.

In the first link mechanism 11a (details are shown in FIGS. 3,6), a first base plate 14a supports main bodies of a primary link 15a and a secondary link 16a in shafts 18a, 19a, and the lid 5a supports the top end thereof by shafts 20a, 21a. The shaft 18a is arranged behind the shaft 19a (in the direction of the vehicle body in FIG. 1), and the shaft 20a is arranged behind the shaft 21a. The first primary link 15a is shorter than the first secondary link 16a, and gap between the shafts 18a and 18b is wider than gap between the shafts 20a and 21a.

Length of the first primary link 15a and first secondary link 16a, the gap between the shafts 18a and 19a, and the gap between the shafts 20a and 21a are determined such that, the motor 12a drives an interlocking gear 13a to rotationally move from state in which the first lid 5a is inclined forward (FIG. 2, closing state), through transitional state (FIG. 4), to state in which the first lid 5a is inclined backward (FIG. 3, opening state). When the motor 12a is reversely rotated, the first lid 5a returns to the closing state through the transitional state, in the reverse process.

In the second link mechanism 11b (details are shown in FIGS. 3,4), a second base plate 14b supports main bodies of a primary link 15b and a secondary link 16b in shafts 18b, 19b, and the lid 5b supports the top end thereof by shafts 20b, 21b. The shaft 18b is arranged behind the shaft 19b (see the above description), and the shaft 20b is arranged behind the shaft 21b. Gap of the shafts (between the shafts 18b and 20b) of the primary link 15b is approximately equal to gap of the shafts (between the shafts 19b and 21b) of the secondary link 16b, gap between the shafts 18b and 19b is approximately equal to gap between the shafts 20b and 21b, and the shafts are arranged such that the lines connecting the shafts are approximately parallel, for the second lid 5b not to hit the supply gun or a bumper in the opening position. For this reason, the gaps between the shafts are not exactly equal, and the lines connecting the shafts are not exactly parallel.

That is, the primary link 15b, the secondary link 16b, and the shafts 18b to 21b consist parallel link structure with four clausal structures. For this reason, the motor 12b drives an interlocking gear 13b to slide keeping the attitude obliquely downward from closing state in which the second lid 5b is inclined forward (FIG. 2), through transitional state (FIG. 4), to opening state (FIG. 3). When the motor 12b is reversely rotated, the second lid 5b returns to the closing state through the transitional state, in the reverse process.

The motors 12a, 12b are controlled by a control device of the vehicle and driven interlocking with other parts by operation from a remote key.

Figure 7A:
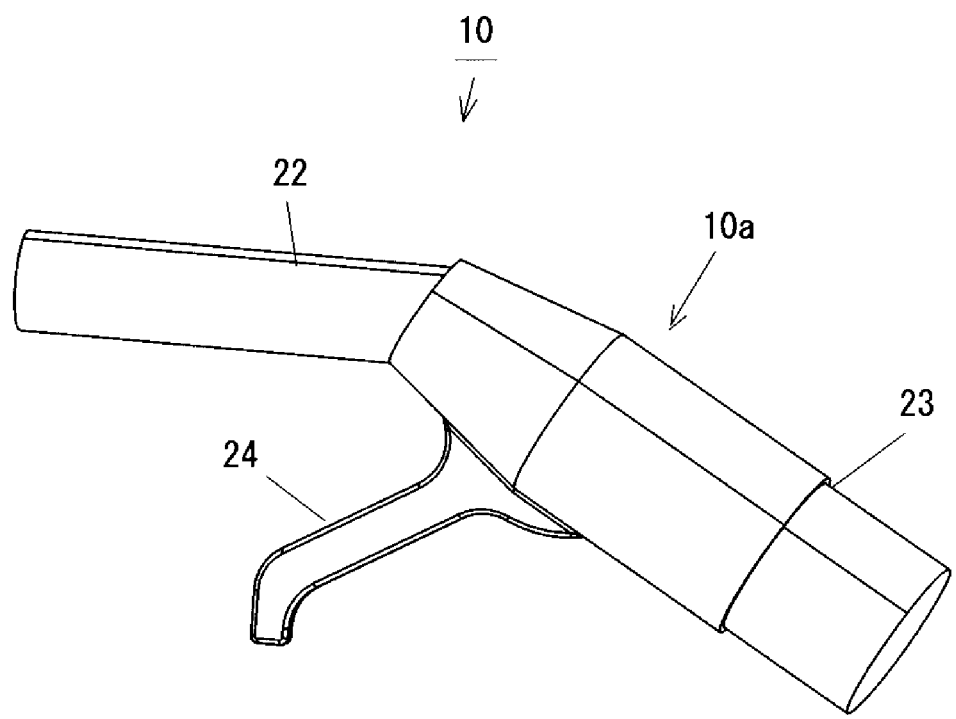
FIG. 7A is an oblique view of a rapid charging supply gun.
Figure 7B:
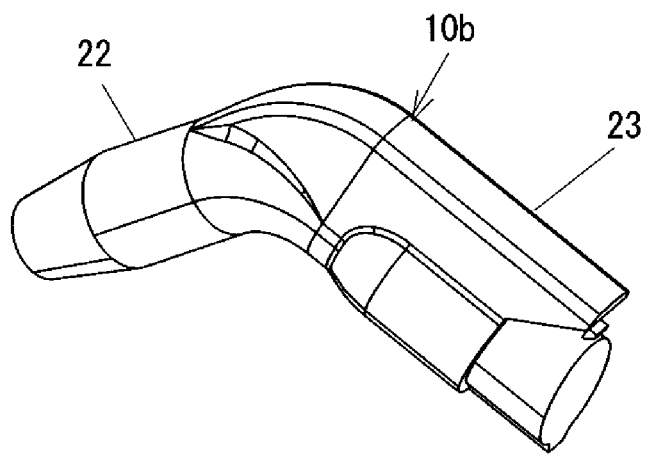
FIG. 7B is an oblique view of a normal charging supply gun.

FIG. 7A, B shows the supply gun, and the quick charging supply gun 10a and the normal charging supply gun 10b. Both guns 10 include a handle unit 22 and a connection unit 23. The handle unit 22 and connection unit 23 are integrally connected in obtuse angle as shown in FIG. 7. In the present embodiment, the quick charging supply gun 10a includes a connection operation lever 24 laying from the connection unit 23 to below the handle unit 22.

When the energy source is supplied, a power switch of the new generation vehicle is turned off, and opening of the lid 5 is commanded from the remote key. Then each motor 12a, 12b is driven in opening direction. Thus each of the upper and lower lids 5a, 5b (FIG. 8) held in the closing position moves in an opening direction. More specifically, the upper first lid 5a is rotationally moved from state in which the lid is inclined forward (FIG. 8) to state in which the lid is inclined backward (FIG. 9) while being moved upward by the opening and closing device 6a, and at the same time, the lower second lid 5b is slidden downward keeping the attitude.

Figure 9:
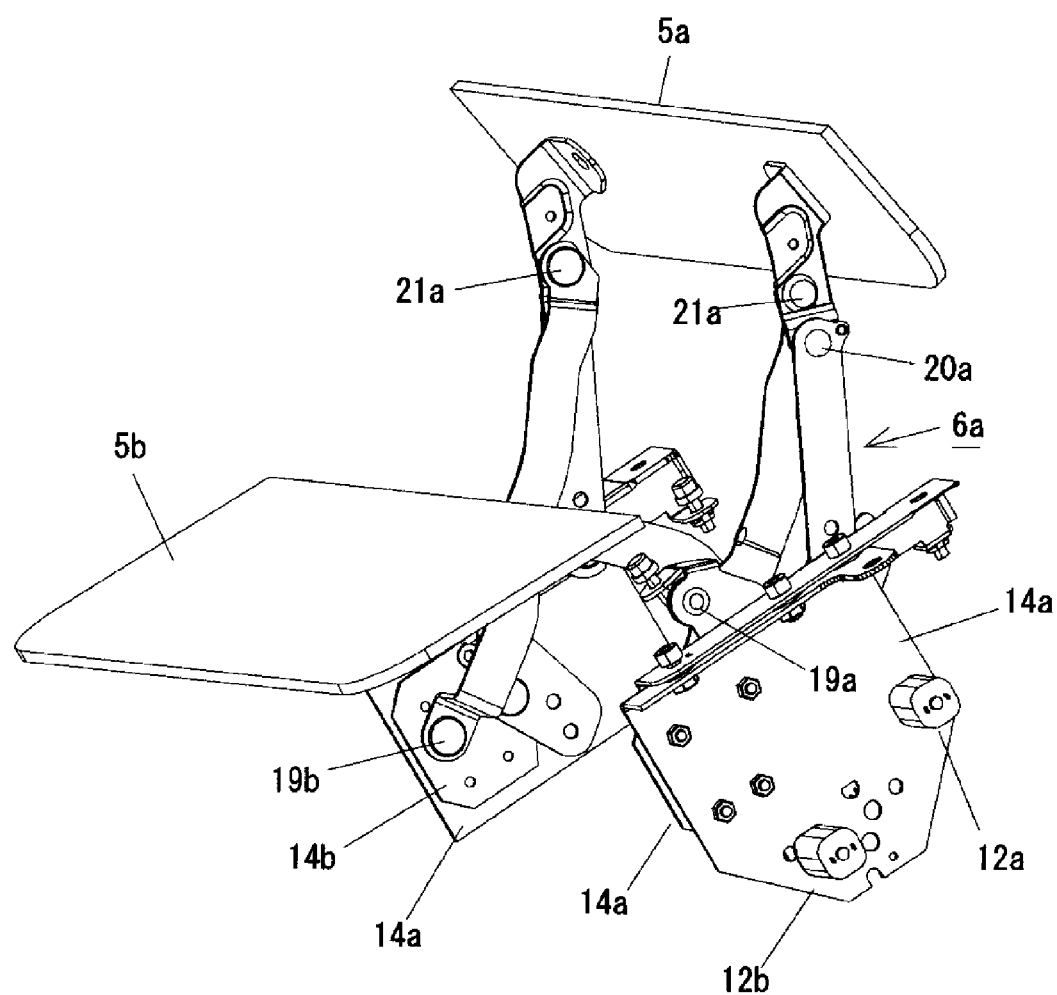
FIG. 9 is an oblique view of lid opened state.

In the process mentioned above, the storage recess space 7 of the energy receiving port 4 is widely opened (state in FIG. 9). In this state (the opening position), the control device of the vehicle stops driving of the motors 12a, 12b, and make the first lid 5a and second lid 5b keep the position. The control device monitors detection signals from a sensor detecting rotation angle of the primary link 15 and the secondary link 16 or a load sensor, and determines the time to stop the motors 12a, 12b.

In the next step, the user holds the supply cable equipped with an electrical outlet on one end and the supply gun (the electricity supply gun) on the other end, connects the electrical outlet to an electric source, and connects the supply gun to the receiving port 8 (an inlet) in the energy receiving port 4. Then the user closes the lid 5 by operating the remote key after the user confirms the connection. As a result, the motors 12a, 12b rotates in a direction reverse to that mentioned above, to make the lid 5 move in the closing direction by the link mechanisms 11a, 11b.

In this time, the first lid 5a moves downward while rotating to return from state in which the lid is inclined backward to state in which the lid is inclined forward, and the second lid 5b slides obliquely upward from below. Since, as described above, the supply gun has been connected to the receiving port 8, the first lid 5a moves over and covers the supply gun, and the second lid 5b hits the obtuse angle part (the part connecting the handle unit 22 and the connection unit 23) from below (FIG. 11).

Figure 10:
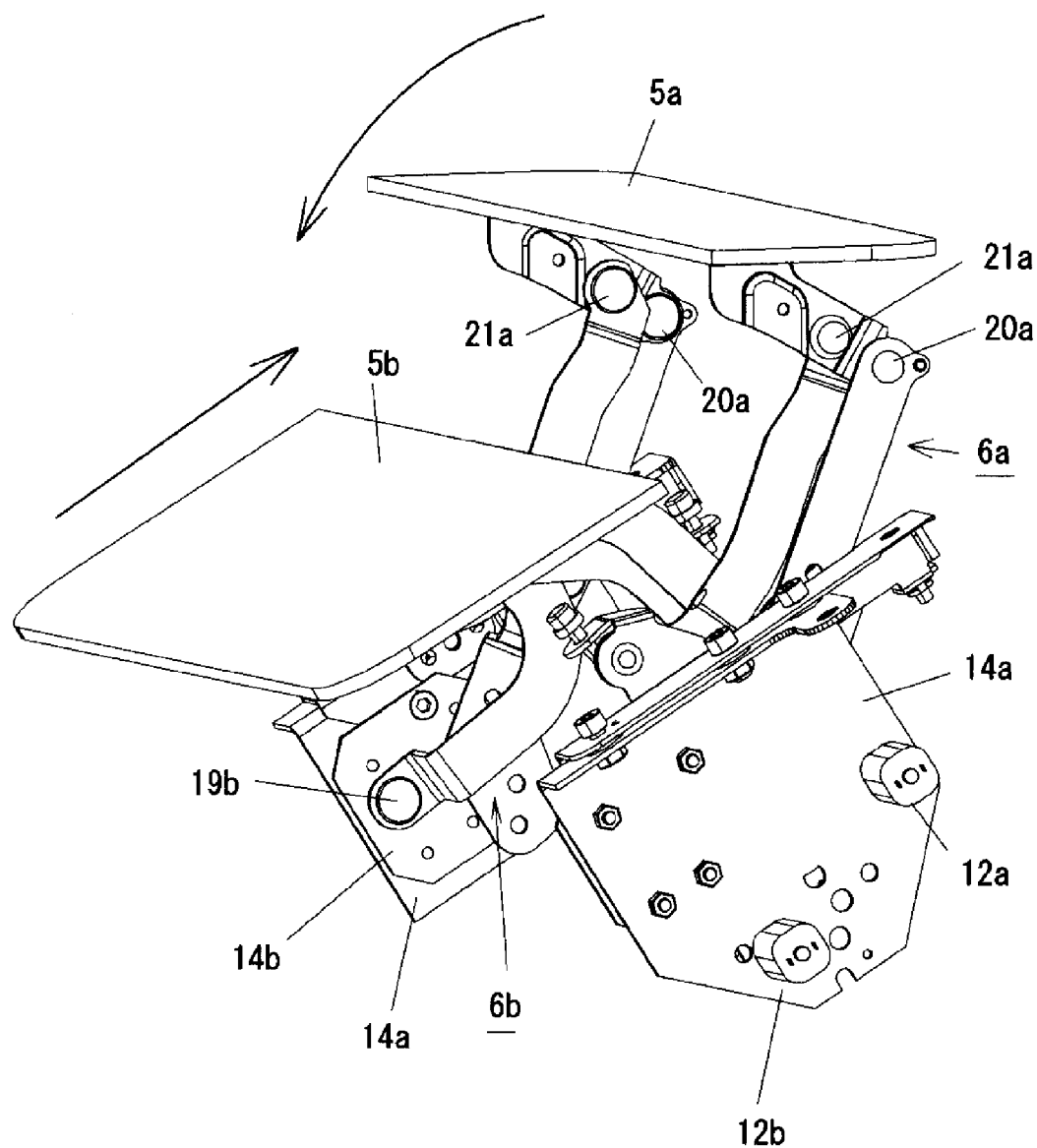
FIG. 10 is an oblique view of state in which a lid is in locking position.
Figure 11:
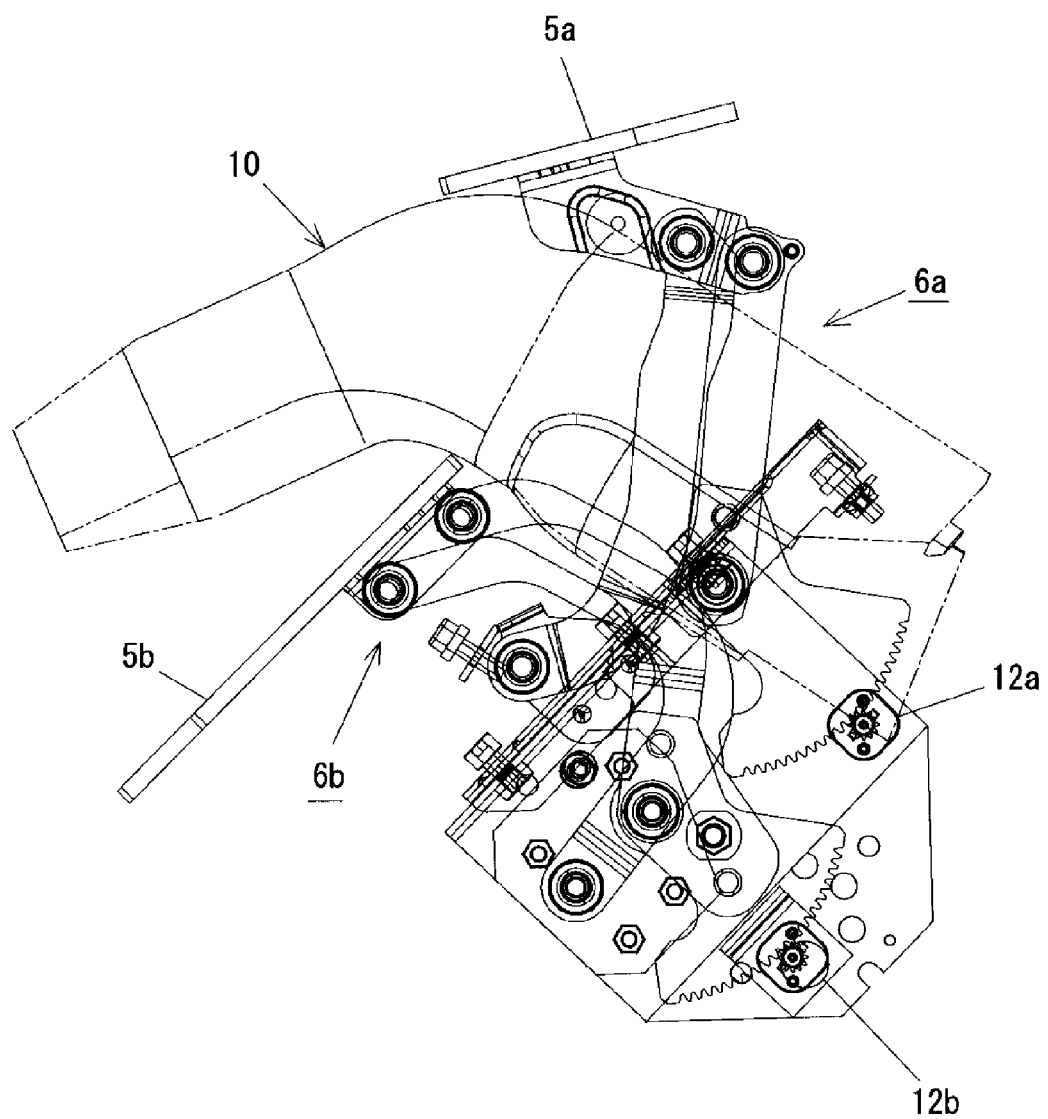
FIG. 11 is a side view of state in which a supply gun is locked by a lid.

This state is, as clearly shown in FIG. 11, state in which upward movement and forward movement of the supply gun are prevented. Therefore, the supply gun can not be removed from the energy receiving port 4, and the supply gun is still in locked state. When the control device of the vehicle detects the locked state, the control device stops driving of the motors 12a, 12b and keep the state (state in FIG. 10). The locked state is detected based on signal from the load sensor or arrival of the link to a set position specified in advance for rotation position of the link.

The control device of the vehicle keep the above state until energy receiving is completed. The rotation sensor or the load sensor may detect operation to remove the supply gun by force and output theft prevention alarm.

When the user removes the supply gun, the remote key outputs signal of opening the lid, and the control device of the vehicle unlocks the locking state and drives the motors 12a, 12b to move the lid 5 to the opening position.

Figure 8:
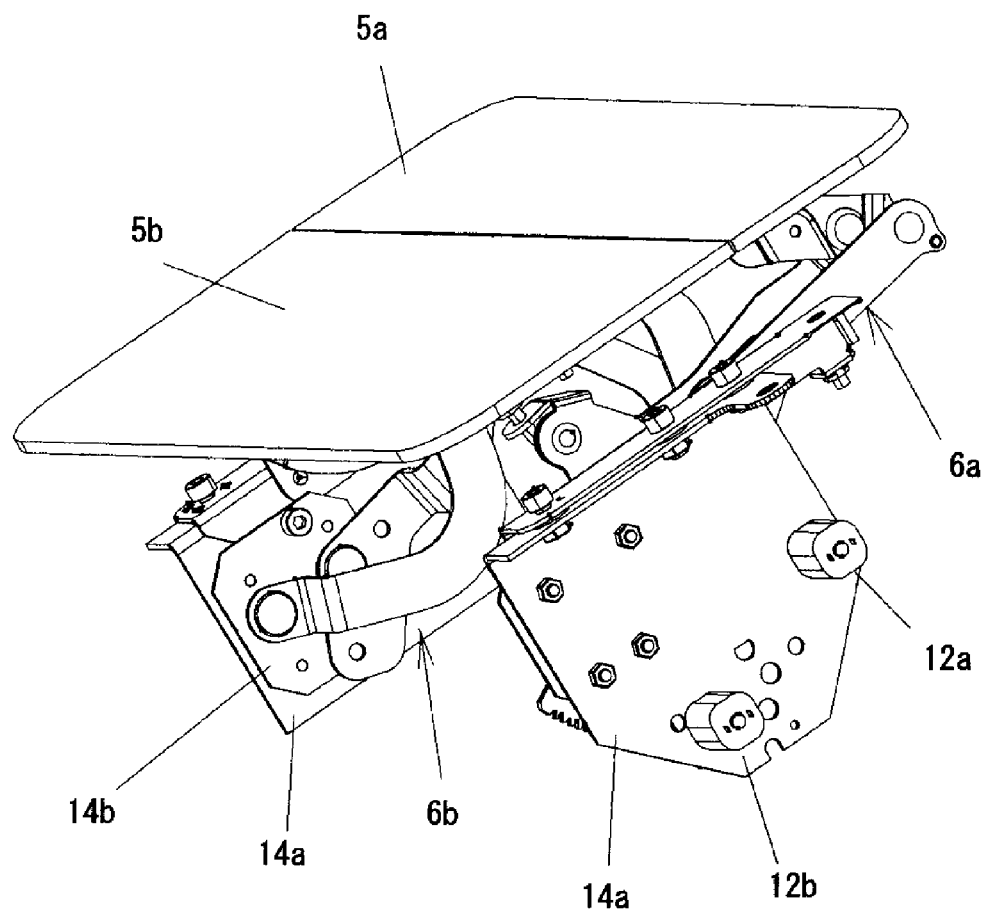
FIG. 8 is an oblique view of lid closed state.

After the supply gun is removed from the energy receiving port 4, the user operates for closing the lid by the remote key, and the control device of the vehicle drives the motors 12a, 12b to make the lid 5 close the energy receiving port 4 (state in FIG. 8).

According to the present embodiment, the supply gun are held by the first lid 5a rotationally moved downward at the same time the supply gun is pinched by the first lid 5a and the second lid 5b moved upward, and the top end of the second lid 5b hits the obtuse angle part of the supply gun, so the supply gun can not be removed from the energy receiving port 4.

In addition to that, since the lower edge of the first lid 5a and the upper edge of the second lid 5b comes closer to each other to make the energy receiving port 4 in almost closed state, possibility to have mischief to the interior part of the energy receiving port 4 decreases compared to a case in which the energy source is supplied in opening state.

It should be noted that, when a cut part is provided on the lower edge of the first lid 5a and the upper edge of the second lid 5b to make the supply gun pass through, the energy receiving port 4 may be set in almost closed state during the energy supply. In this case, the cut part is obvious at the point the first lid 5a and the second lid 5b are attached to each other when the supply gun is removed and the first lid 5a and the second lid 5b is set in the closing state, so a decoration member such as an emblem for hiding the cut part may be attached to one of the lids, rotatably for example.

Figure 12:
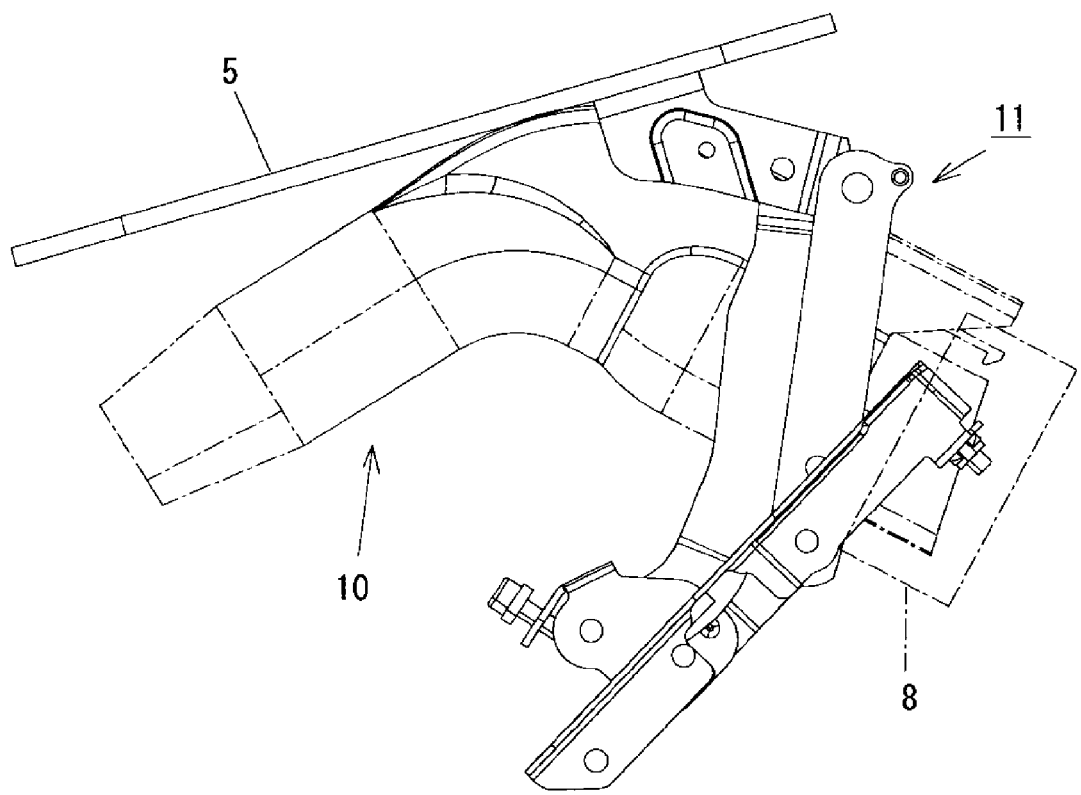
FIG. 12 is a side view of a lid opening and closing device according to another embodiment (in locking state).

FIG. 12 shows the second embodiment in which the lid 5 consists of a plate and the supply gun (the normal charging supply gun 10b) is kept at the position where the supply gun is held by the [5] rotationally moved so as to be locked at the position. The lid 5 is opened and closed via the link mechanism 11, and driven by a drive device not shown in the figure. The opening and closing of the lid by the drive device and the link mechanism 11 can align the lid 5 at the opening position, the locking position, and the closing position in which the storage recess space 7 is closed.

The supply gun is connected to the receiving port 8 when the [5] is at the opening position, and the lid is closed to the locking position while being connected to the receiving port 8. Then electricity is supplied. When the electricity supply is completed, the lid 5 is returned to the opening position such that the supply gun can be removed. When the supply gun is removed, the lid 5 is rotationally moved to the closing position to seal the storage recess space 7.

Same effect can be obtained in the second embodiment as in the first embodiment.

As described above, the embodiment of the EV car which uses electricity as driving source, but similar configuration may be applied to the PHEV car or the car using the hydrogen which requires long time for receiving the energy source.

The inclination direction of the closed lid is forward in the present embodiment, but the inclination direction depends on the part where the energy receiving port 4 is provided in the vehicle body.

In the embodiments, opening and closing operation of the lid 5 is performed from the remote key, but may be performed from a console panel installed in the vehicle.

A case of the normal charging gun is explained, but similar configuration may be adopted for the quick charging gun, though the movement of the first lid 5a and the second lid 5b are different between in the cases.

EXPLANATION OF REFERENCE NUMERALS

1 new generation vehicle
2 vehicle body
3 energy receiving port device
4 energy receiving port
5 lid
5a first lid
5b second lid
6 opening and closing device
6a first opening and closing device
6b second opening and closing device
7 storage recess space
8 receiving port
8a quick charging inlet
8b normal charging inlet
9 supply cable (tube)
10 supply gun
10a quick charging supply gun
10b normal charging supply gun
11 link mechanism
11a first link mechanism
11b second link mechanism
12 motor
12a first motor
12b second motor
13 interlocking gear
13a first interlocking gear
13b second interlocking gear
14 base plate
14a first base plate
14b second base plate
15 primary link
15a first primary link
15b second primary link
16 secondary link
16a first secondary link
16b second secondary link
17 pinion
17a first pinion
17b second pinion
18 shaft
18a first shaft
18b second shaft
19 shaft
19a first shaft
19b second shaft
20 shaft
20a first shaft
20b second shaft
21 shaft
21a first shaft
21b second shaft
22 handle unit
23 connection unit
24 connection operation lever

The invention claimed is:

1. An energy receiving port device, comprising;
    a receiving port in a storage recess space of a receiving port part provided in a vehicle body; and
    a lid for opening and closing the receiving port part, wherein:
    the lid makes movement in a removing direction of a supply gun connected to the receiving port impossible during energy supply,
    the lid comprises a first lid and a second lid, wherein the first lid and the second lid form a plane lid when the first and second lids are closed,
    the supply gun is configured to be pinched by the first lid and the second lid to make the movement in a removing direction of the supply gun impossible,
    the first lid is configured to be rotated to move, and the second lid is configured to be slid to move.

2. An energy receiving port device according to claim 1, wherein the energy receiving port device is configured to be set in positions of, a closing position in which the first lid and the second lid close the receiving port, a locking position in which the supply gun is pinched by a lower face of the rotated first lid and a top end of the second lid, and an opening position in which the supply gun can be inserted to and removed from a gap between the first lid and the second lid, wherein the movement in the removing direction of the supply gun is impossible in the locking position.

3. An energy receiving port device according to claim 1, wherein the first and second lids are configured to be opened and closed by a link mechanism connected to a drive device.

4. An energy receiving port device according to claim 3, wherein the link mechanism is configured to be locked a position in which movement in a removing direction of the supply gun is impossible.

5. An energy receiving port device according to claim 4, wherein the drive unit is a motor, and the motor locks the link mechanism in the locking position.

6. An energy receiving port device according to claim 5, wherein the link mechanism is configured to be driven by one or more motors and operation of the motors are linked when plural motors drives the link mechanism.

7. An energy receiving port device according to claim 2, wherein the first and second lids are configured to be opened and closed by a link mechanism connected to a drive device.

* * * * *